UNITED STATES PATENT OFFICE.

ROBERT A. FISHER, OF PHILADELPHIA, PENNSYLVANIA.

MANUFACTURE OF SIZING MATERIAL FOR PAPER-MAKERS' USE.

SPECIFICATION forming part of Letters Patent No. 321,093, dated June 30, 1885.

Application filed March 12, 1885. (No specimens.)

*To all whom it may concern:*

Be it known that I, ROBERT A. FISHER, of Philadelphia, and State of Pennsylvania, have invented a new and useful Improvement in the Manufacture of a Sizing Material for Paper-Makers' Use, of which the following is a full, clear, and exact description.

My invention consists in the production (directly from the mineral bauxite or any other alum-clay containing iron) of a white substance containing sulphate of alumina, sulphate of zinc, and ferrous sulphate, in a porous or vesicular condition.

The first step in my process is to produce a solution of sulphate of alumina containing iron. The method by which this is accomplished must be somewhat modified, according to the nature of the alum-clay that is used. Some clays require calcination before being subjected to the action of sulphuric acid. Others do not. Some aluminous substances can be decomposed by cold sulphuric acid. Others require to be brought into contact with hot acid. If the mineral bauxite be used to prepare the solution of sulphate of alumina and iron, the following is a convenient method of producing the said solution; but it may be varied, according to circumstances. First, the bauxite should be reduced to a fine powder, then sulphuric acid of density 50° Baumé (more or less) should be heated in a suitable lead-lined tank to the temperature of 190° Fahrenheit, more or less. The relative proportions of bauxite and sulphuric acid to be used will depend upon the alumina contents of the bauxite. It may be stated, in general terms, that one part, by weight, of the aluminous material will require about two (2) parts, by weight, of sulphuric acid of density 50° Baumé. Soon after the bauxite and acid come into contact a violent chemical reaction will begin, and the contents of the vat will rapidly expand. To prevent the mass from overflowing, a small quantity of water must be added from time to time. When the chemical reaction shall have ceased, water or wash-liquor from previous operations must be added to the contents of the tank until the liquid has a density of 26° Baumé, more or less. The insoluble material can then be separated, either by ordinary filtration or by employment of a filter-press, or by allowing the insoluble matter to subside. The clear liquor thus obtained is made from an aluminous material containing ferric oxide, will be of a yellow or brown color, and will not produce a white porous substance, but a porous body of an objectionable buff or brown color. Therefore the next step in my process is to convert the ferric oxide contained in the aluminous solution to ferrous oxide. This can be accomplished by the use of any suitable reducing agent, be it gaseous liquid or solid. Sulphureted hydrogen gas, sulphurous acid in the gaseous or liquid condition, or certain sulphides or hyposulphites, or sulphites, or zinc or lead in the metallic condition may be used as reducing agents; but I prefer the use of zinc in the metallic condition. The solution of sulphate of alumina containing ferric sulphate, either cold or previously heated, (heat expedites the process,) is submitted to the action of zinc in the form of dust or scrap zinc, or of feathered "spelter," or other form. A convenient plan is to place the zinc in one or more wicker-baskets submerged in the solution. The amount of zinc required to reduce the ferric sulphate to ferrous sulphate will depend upon the amount of ferric sulphate present in the solution. Two (2) pounds of zinc to one hundred (100) pounds of the white porous material to be produced may be more than enough.

To carry out my invention it is not necessary to delay the reduction of the ferric sulphate to ferrous sulphate until a clear ferruginous solution of sulphate of alumina has been obtained. The said reduction may be commenced in the attacking-vat soon after the chemical reaction between the bauxite or other alum-clay has begun, or at any time subsequently; and should this method be preferred, the required amount of zinc, (preferably in the form of dust or other finely-divided condition) may be placed in contact with the muddled liquor either in the attacking-vat or other receptacle into which the said liquor may have been transferred; but I prefer to defer the reduction of the ferric sulphate to ferrous sulphate until after the chemical reaction between the alum-clay and sulphuric acid shall have been completed and subsequent to removal of insoluble matter from the solution.

The next step in my process (after ferric sulphate has been reduced to ferrous sulphate) is to convert the liquid into a white porous easily-soluble mass. To accomplish this result the liquid is first concentrated in a suitable vessel, heated by steam or otherwise until it attains the density of 65° Baumé, (more or less.) The concentrated liquid is then cooled with or without stirring until it begins to thicken. Then a small quantity of bicarbonate of soda in fine powder (in the proportion of one pound, more or less, to one thousand pounds of the white porous substance to be produced) is sprinkled upon the surface and stirred rapidly into the mass, which, when thoroughly mixed and sufficiently cool, is discharged into a suitable receptacle to harden. When sufficiently cool, the resulting product is broken up into lumps of the required size.

The desired porous or vesicular structure may be produced by adding to the hot viscid aluminous mass aforesaid a small quantity of bicarbonate or carbonate of soda, potassa, lime, or other alkali or alkaline earth, or other salt of an alkali or alkaline earth or other base, or any sulphide, sulphite, or other compound which will set free an acid, vapor, or gas, so that the same in the act of escaping will inflate the mass and render it frothy while in process of cooling and hardening, and whereby it becomes full of pores or vesicules. A like result, though less perfect in its operation, may be obtained by the rapid injection of air, steam, vapor of water, or other gaseous body into the hot viscid mass of sulphates of alumina, zinc, and iron, the object being the production of the porous or vesicular condition of the mass when in the act of hardening.

I am aware that Henry Pemberton, of Allegheny City, Pennsylvania, has patented a process, No. 82,747, for producing pores or vesicules in pure sulphate of alumina made by treating pure hydrated alumina with cold sulphuric acid.

I am also aware that Francis Laur, of France, patented, No. 208,615, a process in which he uses zinc to convert ferric oxide into ferrous oxide in an aluminous solution to produce an aluminous compound for paper-making, "in cake or ground form"; but there is considerable practical difficulty in breaking and grinding up a hard dense aluminous cake, and to produce Laur's product in the form of powder, as generally sold, requires air-drying for several days, crushing the air-dried product, and finally drying the powder thus obtained by artificial heat. My improved process obviates the necessity of these several operations, and enables me to produce within an hour after the solution has been concentrated to the proper density a superior merchantable article at a considerable saving of time and money.

Having thus described my invention, what I claim as new, and desire to secure by Letters Patent, is—

1. The process described of manufacturing a porous material for paper-makers' use, containing sulphate of alumina, sulphate of zinc, and ferrous sulphate, substantially as herein set forth.

2. The process herein described of producing directly from any aluminous substance containing iron a white porous sizing material for paper-makers' use, which contains both zinc and iron, substantially as herein set forth.

3. The process herein described of producing directly from any aluminous substance containing iron a white porous sizing material for paper-makers' use, consisting, essentially, in first heating sulphuric acid and mixing into it any ferruginous alum-clay, adding water from time to time to prevent an overflow, then reducing ferric oxide to ferrous oxide by the action of zinc either before or after the chemical reaction of the acid and clay is complete, then decanting the clear liquor, then concentrating the same to density of 65° Baumé, (more or less,) then mixing bicarbonate of soda into the hot viscid mass to produce a porous or vesicular structure, and finally breaking the mass after it has sufficiently cooled into lumps of the desired size.

ROBERT A. FISHER.

Witnesses:
MATT. CLIFTON,
HENRY D. BELL.